Jan. 23, 1945.     A. G. KANDOIAN     2,367,680
GLIDE PATH BEACON
Filed Jan. 19, 1942     2 Sheets-Sheet 1

INVENTOR.
ARMIG G. KANDOIAN
BY
ATTORNEY.

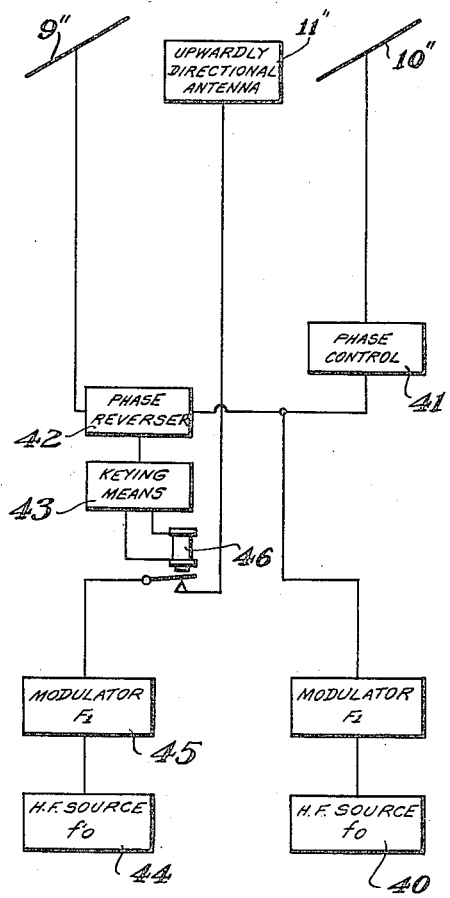
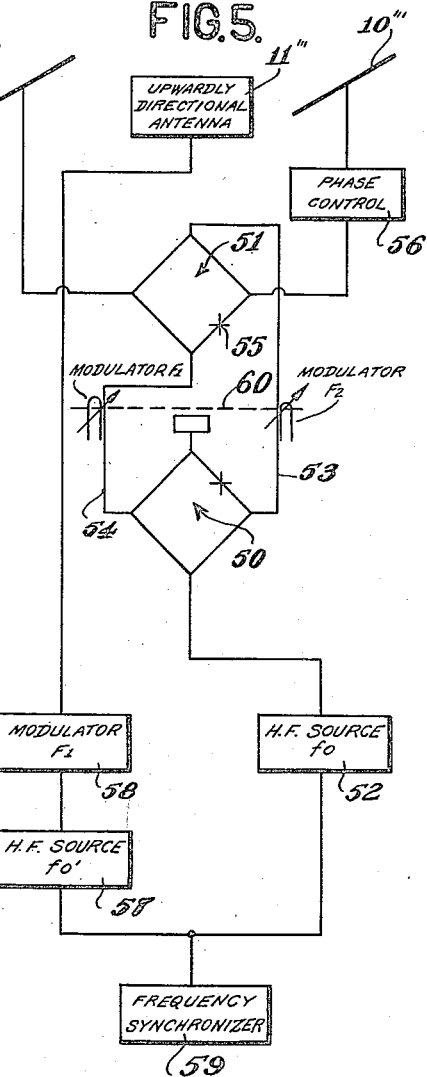

Patented Jan. 23, 1945

2,367,680

UNITED STATES PATENT OFFICE 2,367,680

GLIDE PATH BEACON

Armig G. Kandoian, New York, N. Y., assignor to Federal Telephone and Radio Corporation, a corporation of Delaware Application January 19, 1942, Serial No. 427,338

6 Claims. (Cl. 250—11)

This invention relates to beacon systems and more particularly to beacon systems for producing an equi-signal glide path for landing aircraft.

Systems have been proposed for creating a glide path beacon by producing two energy fields. In these systems each field is formed with a plurality of narrow lobes in a vertical plane, and the two fields are adjusted so that the minimum of one field coincides with the substantial maximum of the other field. The comparative strength of the signals received in the overlapping space of these fields serves to produce a glide path by signal comparison.

In these proposed systems the fields have been produced by antenna units mounted at different vertical heights above the ground, the spacing above the earth being generally a wave length or more in order that the sharp lobes may be produced. Such a system however, creates an additional hazard at the landing field because of the height of the antenna supporting structures.

In accordance with my invention I provide a beacon system which produces a satisfactory equi-signal glide path by the intersection of radiation lobes similar to the proposed system by means of antenna units mounted close to the surface of the earth.

According to a feature of my invention I provide two antennae or radiating arrays, spaced horizontally from one another a relatively large distance and energized in such phase relation that the desired vertical distribution is obtained. The phase relationship may be alternately varied to produced the intersecting patterns, or the antennae may be energized simultaneously with differently characterized energy in proper phase relation to obtain the results desired.

In order to secure the desired distribution the antennae may be mounted at different heights above the earth as well as having the horizontal spacing. Furthermore, the amount of energy fed the arrays may differ for the different signals to control the intersection point of the patterns to provide the desired angle of the glide path.

Alternatively, in accordance with my invention separate differently spaced horizontal arrays alternately keyed or separately supplied with energy may be used to obtain the desired glide path indications.

A better understanding of my invention and the objects and features thereof may be had from the particular description thereof made with reference to the accompanying drawings in which:

Figs. 2 and 4 are schematics of means for feeding antenna units alternately with a varying phase relationship to produce the desired patterns of Fig. 1; and Figs. 3 and 5 are schematics of means for feeding antenna units simultaneously with differently characterized energy in appropriate phase relation effectively to produce the desired patterns of Fig. 1.

I have found that when a pair of parallel horizontally disposed radiating elements are displaced at least a plurality of wave lengths from each other and simultaneously energized, a plurality of lobes having well defined maxima and minima are set up in space. By then altering the energization of these elements so as to amount to substantially a complete reversal of relative phase, that is a phase change of substantially 180°, another and corresponding plurality of lobes also having well defined maxima and minima may be set up. This second set of lobes, it has been found, is the inverse of the first set; that is, the maxima of the first set correspond with minima of the second set, and vice versa. I propose to utilize the equi-signal intersection of a lobe from the first set and an adjacent one from the second set to establish a glide beam. It will be clear that since a phase adjustment of substantially 180° is sufficient to form lobe patterns the inverse of other lobe patterns as just indicated, additional phase adjustment means may serve to change the angle of intersection of two adjacent lobes, and thus to change the angle of the glide path as desired.

Figure 1:
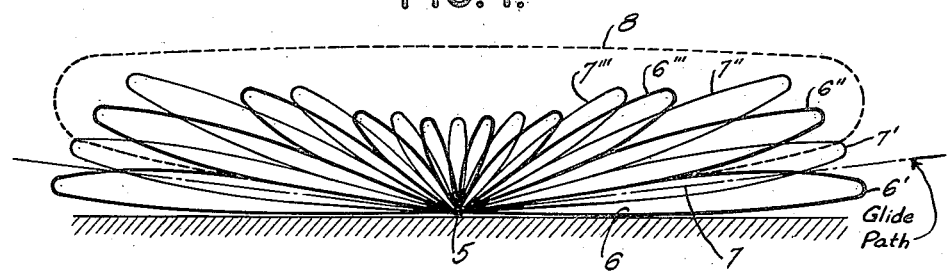
Fig. 1 is an elevation view showing radiation patterns productive of a glide beam in accordance with the invention.

Referring specifically to the showing of Fig. 1, antenna means 5 may comprise spaced horizontally disposed radiators. Each of these radiators may be fed in suitable phase relation to set up a lobe pattern 6, characterized by a plurality of lobes 6′, 6″, 6‴, etc. When the phase of energy supplied the two radiators is reversed substantially 180°, another lobe pattern 7, having a corresponding plurality of lobes 7′, 7″, 7‴, etc. may be set up. Because of the angular displacement of patterns 6 and 7 with respect to each other, a number of equi-signal paths radiating from antenna 5 will be defined by intersection of adjacent lobes, as will be clear.

For purposes that will later become apparent I propose to use the equi-signal path defined by intersection of the lower lobes 6′ and 7′ of the respective patterns 6 and 7 as the glide path for aiding aircraft. However, it will be appreciated that the large number of other equi-signal paths, defined for example by intersection of lobes 7' and 6'', 6'' and 7'', 7'' and 6''', etc. constitute false courses. The number of such false courses and the signal magnitudes characterizing them may be so substantial as to cause great confusion to pilots, and may even set a careless pilot on a dangerously steep approach to the landing field. Accordingly, I propose additionally that antenna means 5 include another unit solely for radiating a substantial signal upwardly. This additional unit of antenna 5 is preferably directional in character and has a pattern 8, characterized by substantially zero radiation in the field of lobe 6'. Preferably also this additional upward radiation is modulated with the same signal as that characterizing the pattern 7. The effect, then, of radiation pattern 8 will be to superimpose the signal characterizing pattern 7 on all lobes of patterns 6 and 7 other than on the lowest 6' of pattern 6. The magnitude of this superposition may be such as to render the signal characterizing the pattern 6 undistinguishable as such at an elevation angle above the glide angle; and hence there will be no chance of finding a glide course other than at the proper gliding angle.

Figure 2:
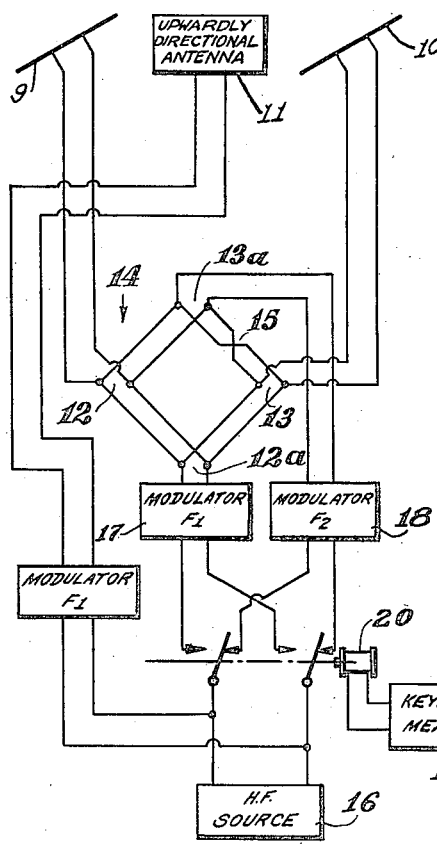

In Fig. 2 I show possible means for generating an equisignal glide path as just described in connection with Fig. 1. In this figure the antenna means 5 of Fig. 1 is shown in more detail to comprise a pair of horizontally disposed, parallel radiators 9, 10 spaced a plurality of wavelengths apart, and another unit 11 for radiating the generally upwardly directional pattern 8. Antenna unit 11 may be any known form directive antenna for producing the desired pattern, and may thus for example comprise an antenna with a reflector or reflecting array.

In the form shown in Fig. 2, antenna elements 9 and 10 are connected to diagonally opposite points 12 and 13 of a transmission line bridge 14. A transposition, indicated at 15, is provided in one of the arms of the bridge. The transposition 15 of bridge 14 assures a 180° phase relation for the energy supplied to the antennas from the opposite terminals 12a, 13a for a purpose that will be made clear later.

According to the circuit shown in Fig. 2, energy to be radiated is fed alternately to terminals 12a and 13a, and that fed to terminal 12a is preferably characterized by one signal $F_1$ while that fed to terminal 13a is characterized by another signal $F_2$. Thus, when say the signal $F_2$ is fed to terminal 13a, antenna elements 9 and 10 will be energized cophasally and the radiation may be such as to produce the lobe pattern 6 of Fig. 1 and necessarily the respective lobes 6', 6'', etc. of this pattern will be characterized by the signal $F_2$. Alternately, when the signal $F_1$ is supplied to terminal 12a another radiation pattern may be set up due to the substantially 180° phase shift occasioned by the transposition 15. It will be clear that this other pattern may correspond to pattern 7 in Fig. 1, and the lobes 7', 7'', etc. will then be characterized by the $F_1$ signal. The glide path is then readily determinable by a comparison of the magnitudes of the $F_1$ and $F_2$ signals appearing in lobes 7' and 6', as will be clear.

In the form shown, the $F_1$ and $F_2$ signals are alternately supplied to the antennae 9 and 10 in the above manner by a relatively simple keying device. This device may comprise a carrier frequency source 16 alternately feeding two modulators 17 and 18. Modulator 17 may serve to characterize the carrier with the signal $F_1$ and feed it to terminal 12a in the above-indicated manner and modulator 18 may similarly supply terminal 13a with carrier modulated by the signal $F_2$. A keying device 19 may serve to operate and release a relay 20 in order to effect the above-mentioned switching operation.

With the apparatus thus far described, it will be clear that a number of possible glide paths may be set up due to the intersection of adjacent $F_1$ and $F_2$ characterized lobes. In order to eliminate any possibility of mistaking most of these paths for the correct glide paths as determined by the intersection of lobes 6' and 7', antenna unit 11 is supplied with the same carrier modulated with the same signal $F_1$ as that characterizing lobe 7'. As indicated above, a pilot approaching such a combination of radiation patterns will, if he is far enough away, first only hear or detect $F_2$ characterized radiation. As he approaches the glide path, the magnitude of the $F_1$ signal due to lobe 7' will increase, and, of course, on the correct path both these magnitudes will coincide. If due to some inadvertence the pilot misses or overshoots the glide path, he will find himself in a field of energy characterized substantially by the $F_1$ signal and will never find the magnitudes of $F_1$ and $F_2$ equal until he is again on the correct glide path. It will thus be impossible for the pilot to come down on a false course.

Figure 3:
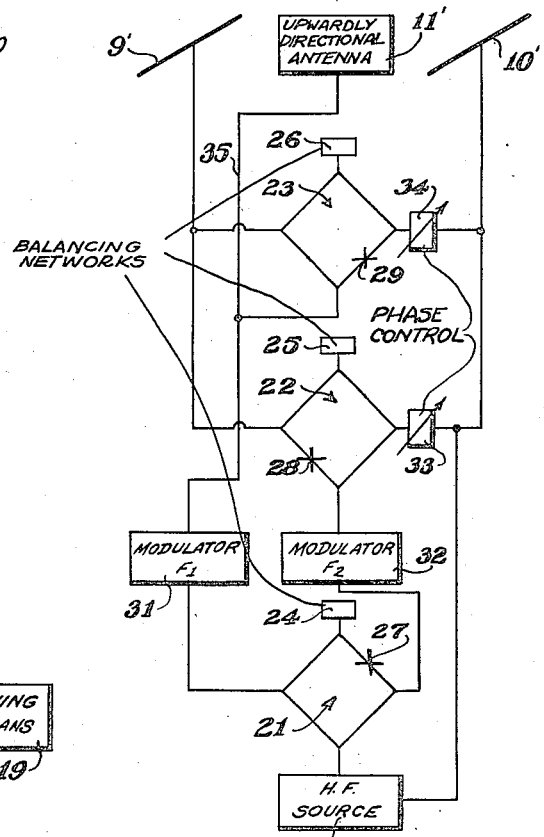

In Fig. 3, I show an alternate preferred form for setting up a lobe pattern of the nature indicated in Fig. 1. According to this alternate preferred form, it is not necessary to use the keying arrangement of the circuit of Fig. 2; and antenna elements 9' and 10', which correspond to elements 9 and 10 of Fig. 2, may be continuously fed. In order to effect this continuous feeding, I make use of a plurality of conjugate networks 21, 22, 23 of the type disclosed in Patent No. 2,147,809, issued February 21, 1939, to Andrew Alford. Each of these networks is shown in very schematic form, and includes in accordance with the teachings of the above-mentioned patent, balancing networks 24, 25, 26, and phase reversal means in one arm of the network, as indicated by crosses 27, 28, 29.

As shown, the first of these conjugate networks 21 is employed to distribute carrier frequency energy, as supplied by source 30, to modulators 31 and 32 which characterize the carrier with signals $F_1$ and $F_2$, respectively. Conjugate network 22 is employed to distribute the $F_2$ characterized energy to antennas 9' and 10' in generally opposed phase relation, and network 23 is employed for the same purpose in the case of $F_1$ characterized energy. As before in the case of the circuit of Fig. 2, appropriate phase displacement means 33, 34 may be employed to provide a means of adjusting the glide path angle as desired.

The operation of the circuit of Fig. 3, as understood, is substantially as follows:

Inasmuch as the phase reversal element 27 of network 21 is in one of the upper branches of that network, carrier frequency energy supplied to modulators 31 and 32 is in the same phase. $F_2$ modulated energy encounters network 22, is supplied to antenna 9', and is substantially reversed in phase with respect to its supply to antenna 10'. Output of modulator 31 encounters conjugate network 23, and the phase of $F_1$ characterized energy supplied to antenna 9' is substantially opposed to that supplied antenna 10'. It is clear that this phase reversal effect in the cases of networks 22 and 23 is obtained by virtue of the phase reversal elements 28, 29 being in each case in the direct path of energy supplied to the antennae. Of course, it is further clear that in each instance the energy supplied to the respective antenna elements may not be in complete phase opposition because of the adjustment of phase displacement means 33 or 34 in order to obtain the desired glide path. It will be noted that in the case of network 22, the phase displacement element 28 is in the arm directly leading to antenna 9' and that in network 23 the phase displacement element 29 is in the arm directly leading to antenna 10'. It follows that the carrier present in antenna 9' due to $F_2$ modulation of modulator 32 will be opposed in phase to the $F_1$ modulation present in the same antenna element, as supplied by modulator 31. It is clear, therefore, that the carrier will be cancelled out, and that in effect antenna 9' will transmit only side bands characterized by the $F_1$ and $F_2$ signals. These side bands, it will be noted, will be substantially 180° phase displaced with respect to each other in accordance with the invention.

Following the same analysis with respect to energy supplied to antenna 10' and considering only the circuit as above discussed, it will be seen that only side band energy is supplied from the conjugate networks to this antenna. It will further be noted with respect to side band energy radiated by antenna 10' that the $F_2$ characterized side band is 180°, or substantially so, displaced in phase with respect to $F_1$ characterized energy. Thus, both antenna elements 9' and 10' may be simultaneously fed in this manner so as to radiate $F_1$ characterized energy displaced substantially 180° in phase with respect to $F_2$ characterized energy. Recalling the above discussion in connection with how the alternate sets of lobes 6 and 7 of Fig. 1 are set up, it will be clear that in Fig. 3 the $F_1$ characterized side band energy may set up one of these sets of lobes, and the $F_2$ characterized side band energy may set up the other.

It is appreciated that with the circuit above described, inasmuch as no carrier will be transmitted, the signals will be unintelligible to the aircraft's detection apparatus. It is accordingly proposed to supply the carrier to one of the antenna elements separately. In the form shown, this supply is effected by a direct connection from the carrier source 30 to the line feeding antenna 10'. In this manner, the equi-signal glide path signals are continuously available for the desired purposes, as will be clear.

As in the case of the circuit of Fig. 2, the undesired lobes may be effectively eliminated by strong radiation above and including the lobe 7'. In the circuit of Fig. 3, antenna 11', which sets up such radiation, may be appropriately fed by a line 35 connected to one of the modulators 31 or 32, depending upon what signals characterize lobes 6' and 7' respectively, as will be clear.

It is considered that in some applications of the invention it may be undesirable to supply energy to the upwardly directional antenna structure on the same carrier as is supplied to the elements 9 and 10. For example, undesired reflections due to an even integral number of half-wave lengths of spacing may set up undesirable additional lobes so that the generally upward radiation pattern 8 of Fig. 1 may not be critical enough.

Accordingly, I propose that the carrier which is used for the generally upward radiation be of a slightly different frequency from that used to feed antenna elements 9 and 10. If, then, the band of frequencies to which the aircraft receiver is responsive be broad enough to admit both carriers, it may detect signals on both carriers without discrimination; and the desired effect of setting up an equi-signal glide path may be obtained with precision and clarity.

Two circuits employing this principle will now be discussed in connection with Figs. 4 and 5.

Fig. 4 shows a circuit which is considered particularly adaptable to use by aircraft employing the aural signal type of detection apparatus wherein if a pilot finds himself to one side of a desired course, a signal of one type characterization will predominate, and if the pilot deviates to the other side of the course, a signal of other characterization will predominate. In this circuit, a high frequency source 40 may supply a carrier $f_0$ to be modulated with a given signal $F_1$ as by plate modulation in the high frequency oscillator. The modulated carrier $f_0$ is then supplied to antenna units 9" and 10" in accordance with the teachings of the above-described circuits. That is to say, antenna elements 9" and 10" being displaced a plurality of wave lengths with respect to each other, the phase of energy supplied thereto is appropriately adjusted by phase control means 41 so that either a maximum or a null of radiation occurs in the horizontal plane. The supply circuit of one of antenna elements 9" and 10" preferably includes a phase reverser element 42 of known form for reversing the relative phase of energy supplied to antennas 9" and 10" by substantially 180°. It will be recalled that when this substantial phase reversal occurs, the lobe pattern generated by antenna elements 9" and 10" will shift in accordance with the shift of the lobes 6 and 7 of Fig. 1. Phase reverser 42 may be controlled periodically to reverse the phase of energy supplied to the antenna element by keying means 43 in a well known manner. Keying means 43 is preferably operative to supply two different repetitive keying signals.

With the circuit thus far described, there will be alternate radiation of lobes such as 6 and 7 of Fig. 1. The time characterization of the set of lobes 6 will be different from that of the set of lobes 7 due to the respective key operations. A pilot approaching the transmitter of Fig. 4 will thus be able to tell which side of the correct glide path he is on by the relative predominance of the signal characterizing one of the sets of lobes 6 or 7, as will be clear.

Now, in accordance with the invention, the upwardly directional antenna system 11" is fed with the same signal $F_1$ characterizing a different carrier $f_0'$. As above indicated, this carrier $f_0'$ is of substantially the same frequency as the carrier $f_0$, but sufficiently different therefrom so that undesired reflections will not be set up by the presence of antennas 9" and 10". In the form shown, the carrier $f_0'$ is supplied from a source 44 and modulated with signal $F_1$ in a modulator 45. In order apparently to drown out all lobes at an elevation angle greater than that of lobe 7', it is proposed that energy thus fed to antenna 11" be keyed in accordance with the keying characterizing the set of lobes 7, whereby all radiation above the glide path elevation angle will appear to be characterized by this signal. In Fig. 4, the means for so keying energy fed to antenna 11" is shown schematically by a relay device 46.

If the detection apparatus on the aircraft to be guided is of the type wherein two constantly transmitted signals are compared as to relative magnitude, it is considered that a transmitter of the form shown in Fig. 5 may be preferable. As in the case of the circuit of Fig. 3, the circuit of Fig. 5 may employ conjugate networks 50, 51 of the type disclosed in the above-mentioned Alford patent. As in the case of Fig. 4, high frequency source 52 supplies a carrier $f_0$, to conjugate network 50 which serves to distribute carrier frequency energy in two paths 53, 54 in the same phase relationship. Paths 53 and 54 are directly connected to diametrically opposed terminals of conjugate network 51 and then supplied to antenna elements 9''' and 10'''. Conjugate network 51 preferably includes a phase reversal element 55 in one of its branches whereby no carrier is supplied to one of the antenna elements (in the form shown, antenna element 10'''), and all of the carrier energy is supplied to the other (antenna element 9'''). In accordance with the invention, energy being supplied in lines 53 and 54 is modulated respectively by the signal $F_2$ and the signal $F_1$. In the form shown, the modulators for this purpose comprise short-circuited quarter wave length sections with a variable shunt capacitance which may be of the form disclosed in the copending application Serial No. 263,367, filed March 22, 1939, by Paul F. Byrne. These modulators are preferably synchronized, as indicated generally by the dotted connection 60.

An analysis of the circuit thus far described will reveal that the $F_1$-characterized sidebands fed to antennas 9''' and 10''' will always be substantially 180° displaced in phase with respect to the $F_2$-characterized sidebands. Thus fed, antennas 9''' and 10''' will radiate simultaneously two sets of lobe patterns, as designated generally in Fig. 1 by 6 and 7. In order to make these two lobe patterns distinct, the carrier, which is the same for both signals $F_1$ and $F_2$, is radiated (generally non-directionally) from only one of the antenna elements (in the form shown from antenna element 9'''). As in the case of the prior discussed circuits, appropriate phase control means 56 may be included in the supply circuit of one of the antenna elements 9''' or 10''' in order to adjust the effective glide path angle to the desired degree.

As in the case of Fig. 4, in order apparently to extinguish all of the lobes belonging to the set 6 above the glide path angle an upwardly directional antenna unit 11'''' may be fed with the signal characterizing lobe 7' on a carrier $f_0'$ slightly displaced in frequency from the carrier $f_0$. In the form shown, a high frequency source 57 supplies the carrier $f_0'$ which is modulated at 58 with the signal $F_1$ which is assumed to characterize the set of lobes 7. Inasmuch as the respective frequencies of carriers $f_0$ and $f_0'$ are close together, and since the regulation of these frequencies conceivably may not be sufficiently accurate to prevent a possible simultaneous generation of exactly the same carrier from sources 52 and 57, it may be preferable to include a frequency synchronizing circuit 59 of known form for assuring that should there be any variation of one of the carrier frequencies, the other one will vary in the same sense. In this manner, any coincidence of the carriers may be prevented. It is suggested to this end that the frequency synchronizing unit may be included in an oven in which crystals for generating frequencies $f_0$ and $f_0'$ are both located. Any change in temperature of the oven will have like effects in changing the frequency at $f_0$ and $f_0'$, whereby these frequencies may never coincide.

It will be clear that I have proposed a relatively simple system for determining a glide path accurately and with safety. The antenna elements constituting the radiating system may be disposed relatively close to the ground and thus constitute no hazard to a practical operation of the system. Of course, the requirement that antenna elements 9 and 10 be disposed at least a plurality of wave lengths apart would seem to import that the system would take up a relatively large amount of airport space. However, if short wave lengths as are currently used for purposes of landing aircraft, these antenna elements may even be spaced a matter of a hundred feet or so without impairing the use of landing runways.

Although I have described my invention in connection with the preferred form shown, it is to be understood that many additions, modifications and adaptations may be made within the scope thereof.

What I claim is:

1. An antenna system comprising a pair of parallel antenna elements disposed at least a plurality of wave-lengths apart, means for energizing both said elements simultaneously, whereby a radiation pattern characterized in the vertical plane by a plurality of lobes is set up, further antenna means having an upwardly directional radiation pattern characterized by substantially zero radiation in the direction of the most nearly horizontal of said lobes, means energizing said antenna means with energy characterized in a manner other than that supplied by said first-mentioned means and means energizing said antenna elements with energy characterized in a first manner and with energy characterized in a second manner, the phase of said first-characterized energy being displaced substantially 180° with respect to the phase of said second characterized energy.

2. An antenna system for setting up a glide path pattern, comprising a pair of horizontally disposed antenna elements spaced at least a plurality of wave-lengths apart, means supplying both said elements with energy modulated in accordance with a first signal and energy modulated in accordance with a second signal, phase displacing means for displacing said second-signal-modulated energy in phase with respect to said first-signal-modulated energy, whereby a plurality of radially outwardly extending lobes overlapping in space is set up, one of any two adjacent lobes of which is characterized by one of said signals and the other of said two intersecting lobes is characterized by the other of said signals and phase adjustment means operatively associated with said supplying means to control the angular disposition of said lobes.

3. An antenna system according to claim 2, in which said phase displacing means causes a phase displacement between said first-signal-modulated energy and said second-signal-modulated energy of substantially 180° with respect to each other.

4. An antenna system for setting up a glide path pattern, comprising a pair of horizontally disposed antenna elements spaced at least a plurality of wavelengths apart, means supplying both said elements with energy modulated in accordance with a first signal and energy modulated in accordance with a second signal, said second-signal-modulated energy being substantially displaced in phase with respect to said first-signal-modulated energy whereby a plurality of radially outwardly extending lobes overlapping in space is set up, one of any two adjacent lobes of which is characterized by one of said signals and the other of said two intersecting lobes is characterized by the other of said signals, phase adjustment means associated with said supplying means to control the angular disposition of said lobes, directive antenna means having an upwardly directional radiation pattern characterized by substantially zero radiation in the direction of the nearest horizontal of said lobes, and means energizing said antenna means with energy modulated in accordance with one of said signals.

5. A glide path beacon system comprising a pair of horizontally disposed antenna means displaced at least a plurality of wave lengths apart, means energizing said antenna means simultaneously with carrier energy modulated by a first signal and with energy modulated by a second signal, the phase of said first-signal-modulated energy being displaced substantially in opposition to the phase of said second-signal-modulated energy.

6. A glide path beacon system according to claim 5, wherein said first and said second signals each modulate a carrier of the same frequency and wherein said energizing means includes means supplying a sideband of said first-signal-modulated energy to said antenna means simultaneously with further means supplying a sideband of said second-signal-modulated energy to said antenna means, and further including means supplying carrier frequency energy to one of said antenna means.

ARMIG G. KANDOIAN.